United States Patent [19]

Clarady, Jr. et al.

[11] 4,408,881
[45] Oct. 11, 1983

[54] HOLOGRAPHIC INSPECTION TECHNIQUE

[75] Inventors: Joseph F. Clarady, Jr., Tequesta; Karen L. Jessee, Jupiter; Joe L. Bearden, North Palm Beach, all of Fla.

[73] Assignee: United Technologies Corporation, Hartford, Conn.

[21] Appl. No.: 334,504

[22] Filed: Dec. 28, 1981

[51] Int. Cl.³ .............................................. G01B 9/029
[52] U.S. Cl. ...................................... 356/347; 73/656
[58] Field of Search ................... 356/347, 348; 73/656

[56] References Cited

U.S. PATENT DOCUMENTS 3,548,643  12/1970  Leith et al. ...................... 356/347 X
3,572,936   3/1971  Johnson et al. ...................... 356/348
3,645,129   2/1972  Grant ................................. 73/656 X

OTHER PUBLICATIONS

Edenborough et al., "Holographic Inspection for Thin Cover Sheet Bond Quality on Turbine Components", *Materials Evaluation*, 39, pp. 643–646, Jun. 1981.

Primary Examiner—William L. Sikes
Assistant Examiner—Matthew W. Koren
Attorney, Agent, or Firm—Eric W. Petraske

[57] ABSTRACT

A nondestructive testing technique for examining the integrity of a bonded joint consists of forming a time-average hologram of the object while it is being vibrated at a number of frequencies generated at random within a defined bandwidth.

4 Claims, 1 Drawing Figure

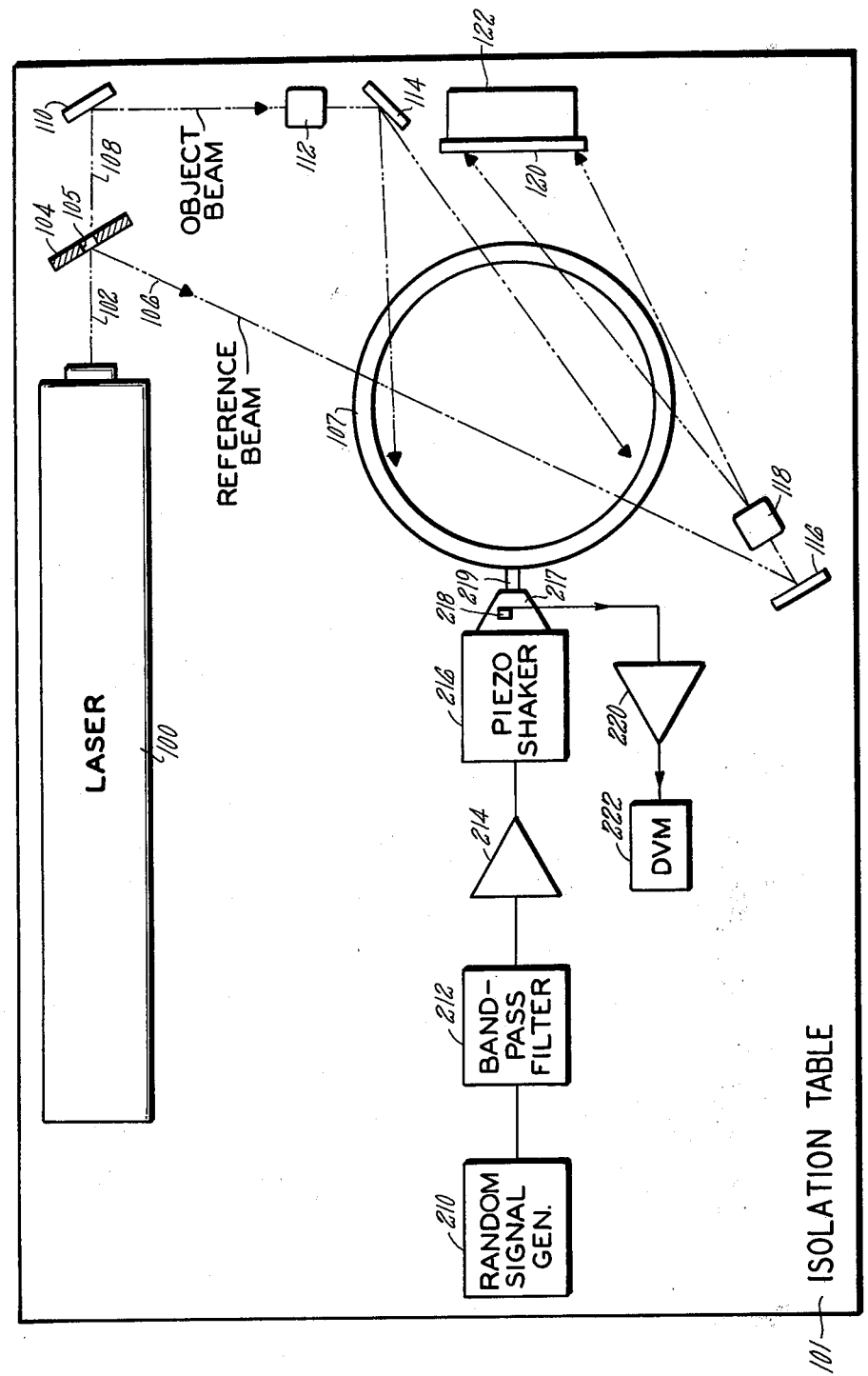

HOLOGRAPHIC INSPECTION TECHNIQUE

DESCRIPTION

1. Technical Field

The field of the invention is nondestructive testing by means of time-average holographic vibration analysis.

2. Background Art

U.S. Pat. No. 3,548,643, issued to E. N. Leith et al on Dec. 22, 1970, illustrates the method of holographic vibration analysis generally and, in particular, discloses in FIG. 11 a technique for analyzing the structure of an object by means of forming a time-average hologram of the object while it is being vibrated. U.S. Pat. No. 3,645,129, issued to Ralph M. Grant on Feb. 29, 1972, discloses a method of testing the integrity of a bonded joint between two members by forming a time-average hologram of the joint while it is being vibrated. This patent teaches away from the present invention in that it teaches that it may be necessary to produce several holograms with varying frequencies of excitation and intensity of vibration in order to produce different vibrational fringes which reveal features of the object that have different characteristics.

DISCLOSURE OF INVENTION

The invention relates to a method of nondestructive testing employing a single time-average hologram exposed while the object being tested is subjected to a plurality of vibrations having frequencies generated at random within a defined bandwidth.

BRIEF DESCRIPTION OF DRAWING

The drawing illustrates in partially pictorial, partially schematic form an embodiment of the invention.

BEST MODE FOR CARRYING OUT THE INVENTION

FIG. 1 illustrates an embodiment of the invention in which laser 100, illustratively an argon laser, generates beam 102 which passes towards mirror 104, a portion of beam 102 being reflected from mirror 104 and forming reference beam 106 and another portion of beam 102 passing through aperture 105 in mirror 104 to form object beam 108. Beam 108 is reflected by mirror 110 through spatial filter 112, then reflected again by mirror 114 to illuminate test object 107. Test object 107 is illustratively a round object having a cylindrical bond between a cylindrical member and an inner abradable member. The shape of the object is, of course, immaterial to the present invention. It is also immaterial if the bond joint being tested for integrity is visible in the hologram or if only the surface of the member being bonded is visible.

Reference beam 106 is reflected by mirror 116 through spatial filter 118 and is directed onto photographic plate 120 supported by plate holder 122. The reference beam and reflected radiation from test object 107 in the object beam combine to form a hologram according to the well known principles of holography as illustrated in U.S. Pat. No. 3,548,643.

Test object 107 is excited by a member 219 rigidly attached to member 217 which transmits vibratory forces from piezoelectric shaker 216 to member 219 and serves as support for a calibrated accelerometer 218. Accelerometer 218 produces a signal which is amplified by amplifier 220 and displayed on digital volt meter 222 which is used to monitor the strength of the forces being applied to the test object. Signals to piezoelectric shaker 216 are provided by random signal generator 210 which generates electrical "white noise," which is modified by band-pass filter 212 which illustratively passes frequencies within a range of 10 kilohertz to 30 kilohertz. The signal from bandpass filter 212 is amplified in amplifier 214 and directed to shaker 216. The whole assembly is mounted on isolation table 101 to maintain the optical components stable during the course of the hologram and piezoelectric shaker 216 is further isolated from the table by conventional means well known to those skilled in the art.

In operation, the vibratory acceleration applied to test object 107 results in vibratory energy transfer through test object 107 to the bonded interface of the two members. If the bond is uniform, the surface of the object which is visible in the hologram will be excited essentially uniformly, subject only to the characteristic modes of the object. If, however, the bond is not uniform and there is a disbonded region within the part of the object visible in the hologram, the member closest to the hologram will vibrate independently of the other member as a result of the applied acceleration and a number of superimposed interference fringes will appear in the hologram. The area over which the fringes extend will be the same as the disbonded area of the joint and the amplitude of vibration, and hence the darkness of the fringes in the exposed hologram, will depend upon the amplitude of vibration and the frequency of vibration relative to the resonant frequency of the disbonded area.

The test object will be accepted or rejected according to the number of defects revealed by inspection of the completed hologram. U.S. Pat. No. 3,645,129, referred to above, teaches away from this invention in that it suggests that it is necessary to expose a number of holograms at different frequencies and different intensities in order to discover all disbonded areas. This method, of course, is time consuming and awkward and is not well suited to a production testing method, which is the object of the present invention.

It has been discovered that the use of random excitation applied to a test object efficiently reveals all disbonded areas within a wide range of sizes and therefore that the number of holograms required may be drastically reduced. In the particular case illustrated in the drawing, the object being tested is cylindrical and so not all the area of the joint is visible in the same hologram. In this case, the hologram views approximately one-quarter of the object and complete inspection is formed by rotating the object and taking a series of holograms. Different test objects may require the exposure of only a single hologram.

In the embodiment illustrated in the drawing, the optical fixtures and the test object were securely clamped to isolation table 101 and piezo-shaker 216 was isolated from the table in order to avoid disturbing the hologram. It was found that satisfactory results were obtained by controlling piezo-shaker 216 to produce an acceleration of approximately 150 g's on the test object. It was also found that the number and position of the clamps which clamped test object 107 to table 101 did not affect the ability of the technique to discover disbonded areas. The strength of the vibration applied to the test object will vary in different situations. It is preferable to use a force that will excite the disbonded areas, but will impart very small amplitudes to the resonant modes of the test object, so that defects in the bond stand out with maximum clarity.

We claim:

1. A holographic test apparatus for testing a test object comprising:
   means for generating an optical object beam and reference beam;
   means for exposing a test object to said object beam;
   means for exposing a photosensitive detector simultaneously to said reference beam and to radiation emanating from said test object for a predetermined exposure time;
   signal generating means for generating electrical signals having frequencies randomly distributed within a frequency range;
   filter means for passing a portion of said randomly distributed frequencies within a predetermined frequency range to form a driving signal;
   means responsive to said driving signal for mechanically shaking, during said exposure time, said test object with accelerating forces having a predetermined average strength.

2. An apparatus according to claim 1, in which said frequency range is between 0 and 50 kilohertz.

3. A method of holographically testing an object comprising the steps of:
   generating an object beam and a reference beam of optical radiation;
   exposing said test object to an object beam;
   exposing a photosensitive detector simultaneously to said reference beam and to radiation emanating from said test object for a predetermined exposure time;
   generating electrical signals randomly distributed in frequency within a predetermined frequency range;
   converting said electrical signals to mechanical accelerating forces having the same frequency characteristics as said electrical signals;
   shaking said test object with said mechanical accelerating forces during said predetermined exposure time.

4. A method according to claim 3, in which said frequency range is between 0 and 50 kilohertz.

* * * * *